United States Patent [19]

Guinn et al.

[11] Patent Number: 5,364,789
[45] Date of Patent: Nov. 15, 1994

[54] MICROBIAL CLEANER

[76] Inventors: Lloyd J. Guinn, P.O. Box 176, Marble Falls; James L. Smith, P.O. Box 8401, Horseshoe Bay, both of Tex. 78654

[21] Appl. No.: 182,843

[22] Filed: Jan. 14, 1994

[51] Int. Cl.$^5$ .......................... C12N 1/00; C02F 3/00; C02F 3/34; C12S 9/00
[52] U.S. Cl. ................................ 435/262.5; 435/248; 435/249; 435/250; 435/252.31; 435/252.34; 435/262; 435/264; 435/821
[58] Field of Search .................... 435/252.31, 252.34, 435/248, 249, 250, 262, 262.5, 264, 821

[56] References Cited

U.S. PATENT DOCUMENTS

| | | | |
|---|---|---|---|
| 4,452,894 | 6/1984 | Olsen et al. | 435/252.34 |
| 4,477,570 | 10/1984 | Colaruotolo et al. | 435/252.34 |
| 4,727,031 | 2/1988 | Brown et al. | 435/244 |
| 4,853,334 | 8/1989 | Vandenbergh et al. | 435/262 |
| 5,128,262 | 7/1992 | Lindorfer et al. | 435/264 |
| 5,132,224 | 7/1992 | Mueller et al. | 435/262 |

OTHER PUBLICATIONS

Oberbremer et al. "Effect of the Addition of Microbial Sufactants on Hydrocarbon Degradation in a Soil Population in a Stirred Reactor" Appl. Microb. Biotechnol, 32: 485–489 1990.

Primary Examiner—Jeffrey E. Russel
Assistant Examiner—Nancy J. Gromet
Attorney, Agent, or Firm—John M. Cone; William L. Clayborn

[57] ABSTRACT

A microbial cleaner comprising at least one hydrocarbon-ingesting microbe strain and a biocatalyst transforms hydrocarbons into nontoxic substances. The biocatalyst includes a nonionic surfactant, a chlorine-absorbing salt, at least one microbe nutrient, and water. The cleaner can be used in virtually any situation requiring the removal of hydrocarbon, including cleaning contaminated soil and treating oil spills on soil and water.

6 Claims, No Drawings

MICROBIAL CLEANER

BACKGROUND

The present invention relates to a microbial composition for transforming hydrocarbons into nontoxic substances.

Pollution resulting from the extensive use of liquid hydrocarbons such oil, solvents, and gasoline presents a serious threat to the environment. Such pollution can result from accidental spills or improper disposal of the hydrocarbons.

It is known that certain naturally-occurring microbes ingest hydrocarbons, thereby converting the hydrocarbons into nontoxic substances, water and carbon dioxide. Given sufficient time, the hydrocarbon-ingesting microbes contained in oil-polluted soil or water will ingest the oil, thereby removing the pollution. However, when the pollution is heavy, removal may take many years.

To decrease the time required to remove oil from polluted soil or water, hydrocarbon-ingesting microbes have been cultured, then applied to the polluted soil or water. This increases the concentration of the microbes, thereby decreasing the time required for the microbes to remove the polluting oil.

U.S. Pat. No. 5,128,262 (Lindoerfer et al.) discloses a method for decontaminating soil contaminated with hydrocarbons in which the soil is aerated and water, a biosurfactant, a synthetic surfactant, and a nutrient which is a water-soluble salt of Na, K, Ca, Mg, or Fe is added to the soil.

U.S. Pat. No. 4,822,490 (Dyadechko et al.) discloses a composition for removing oil from water and soil comprising the bacteria $Psudomonas\ putida$-36 and a mixture of $KNO_3$, $NH_4Cl$, $NH_4H_2PO_4$, and $NH_4NO_3$.

It is an object of the present invention to provide an economical, environmentally-safe, easily-used microbial cleaner which transforms hydrocarbons into nontoxic substances.

SUMMARY OF THE INVENTION

The present invention comprises hydrocarbon-ingesting microbes and a biocatalyst. In the preferred embodiment, the microbes comprise a blend of naturally-occurring, hydrocarbon-ingesting strains of Pseudomonas and Bacillus. The biocatalyst comprises a nonionic surfactant, a chlorine-absorbing salt, nutrients for the microbes, and water. In this embodiment, the nonionic surfactant is nonylphenol polyethelene glycol, the chlorine-absorbing salt is sodium thiosulfate, and the nutrients are urea and sodium hexamethaphosphate.

Before use, the microbes and the catalyst are mixed together. While the cleaner may be used immediately after mixing, for greatest effectiveness it should be allowed to sit for a minimum of two hours, and 24 hours is preferable. This allows the microbes to multiply, increasing their concentration.

The microbial cleaner can be used in virtually any situation in which it is desired to remove hydrocarbons. After the microbial cleaner is applied, water is added as necessary to ensure that the microbial cleaner remains wet.

DETAILED DESCRIPTION

The microbial cleaner comprises two parts: the biocatalyst solution (the "biocatalyst") and blend of naturally-occurring, hydrocarbon-ingesting microbes (the "microbes"). Before being mixed with the biocatalyst, the microbes are alive, but dormant. The biocatalyst contains nutrients which are essential to microbial life.

In this embodiment of the invention, four grams of the microbes are mixed with each gallon of the biocatalyst. When the biocatalyst and microbes are mixed together, the microbes become active. While the cleaner may be used immediately after mixing, if it is allowed to sit for a period of time, the nutrients in the biocatalyst will cause the microbes to multiply at a greatly accelerated rate, thereby creating a very high concentration of microbes. For greatest effectiveness, the cleaner should be allowed to sit for a minimum of two hours, and 24 hours is preferable.

The microbes comprise a blend of naturally-occurring, hydrocarbon-ingesting strains of Pseudomonas and Bacillus. The microbes ingest hydrocarbons and digest them, producing fatty acids, carbon dioxide, and water as primary end products. Such microbes are known in the art.

The biocatalyst comprises the following:

| Chemical | % by weight |
| --- | --- |
| Nonionic surfactant | 5–35 |
| Urea | 0.5–1.0 |
| Sodium Hexamethaphosphate | 0.0001–0.1 |
| Sodium Thiosulfate | 0.005–00.05 |
| Water | 63.85–94.4949 |

The biocatalyst's surfactant acts to break a hydrocarbon down into very small globules to bring it into contact with the water in the biocatalyst. As a result, the microbes are brought into intimate contact with the hydrocarbon, thereby increasing the rate at which they digest it.

The microbes function most efficiently in an environment which is neither acidic nor alkaline. To provide a pH of approximately 7.0, the biocatalyst contains a nonionic surfactant. In this embodiment, the surfactant is nonylphenol polyethelene glycol.

The microbes are detrimentally affected by chlorine. To absorb any chlorine which may be present in the water, the biocatalyst contains sodium thiosulfate.

The remaining ingredients in the biocatalyst provide nutrients which are essential for the microbes' well-being. The microbes require phosphate to live, thus sodium hexaphosphate is provided. The urea in the biocatalyst provides nitrogen, which aids in the microbes' digestive process.

Water is an essential ingredient of the biocatalyst. In addition to hydrating the microbes, the water provides the oxygen which is necessary to sustain them.

EXAMPLES OF USED OF THE MICROBIAL CLEANER SOIL TREATMENT

One of the most important uses of the microbial cleaner is the treatment of soil that has been contaminated with oil or other hydrocarbons. First, the soil must be plowed to the depth of the contamination. The microbial cleaner is then sprayed on the soil at the rate of one-third gallon per square yard of soil. The foregoing rate is for soil with contamination to a depth of 12 to 18 inches. Finally, water is sprayed on the soil until it is 30 to 60 percent saturated. In most cases, the oil will be removed within 30 to 60 days.

Water Treatment

For water in pits, tanks, or ponds, mix the microbial cleaner with the contaminated water at the rate of one gallon of cleaner to four gallons of oil. The preferred method for mixing the cleaner and the contaminated water is to pump water from the bottom of the pit, tank, or pond and spray it on the surface. This process adds oxygen, which helps the microbes to digest the oil, and speeds evaporation of the water. It may be necessary to add water if the oil is not visibly gone by the time the water evaporates. In most cases, the oil will be removed within one to two weeks.

Spills

When oil is spilled, the first consideration is to contain and remove as much of the spilled oil as possible. While the term "oil" is used herein, it is to be understood that term encompasses any liquid hydrocarbon. After containing and removing as much oil as possible, the microbial cleaner is sprayed on the spill until its surface is completely covered. If the spill is on a hard surface such as concrete or asphalt, the cleaner is mixed into the oil with a broom, then the oil-cleaner mixture is rinsed away with water. If the spill is on soil, the cleaner is mixed with the soil with a rake, plow, etc. and water is added to thoroughly moisten the affected area. If the spill is on water, the oil slick must be contained by means of booms. Then, as much oil as possible is removed. Finally, the surface of the spill is covered with the microbial cleaner.

Cleaning Oil-Storage Tanks

The heavier components of crude oil settle to the bottom of oil-storage tanks. To remove the sludge, approximately one gallon of microbial cleaner per ten gallons of sludge is mixed with the sludge.

General Cleaning

The microbial cleaner is an excellent cleaner removing hydrocarbons from floors, equipment, etc. For best results, the cleaner is applied to the surface to be cleaned and the scrubbed with a broom, brush, or power equipment. Additional water is then sprayed on the surface and the cleaner is allowed to stay on the area for 30 minutes. Finally, finally the area is rinsed with water.

The microbial cleaner is excellent for use in a parts cleaner. In parts cleaners, the cleaning action is due to the surfactant, not the microbes. However, while the microbes do not participate in cleaning, over time they will remove any hydrocarbons in the parts cleaner. For use in a parts cleaner the microbial cleaner may be diluted with up to five parts water.

One major advantage of the microbial cleaner is that its microbes are not harmful to humans or to the environment. Thus, even in situations in which the microbes do not act to remove hydrocarbons, that is, when the microbial cleaner is used as a cleaner in situations not involving hydrocarbons, the microbial cleaner provides an advantage over other cleaners in that it does no harm. Further, in such cases, the microbes will act to remove any hydrocarbons the come into contact with, thus helping to remove hydrocarbons from the effluent in the sewer system.

While the preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. A microbial cleaner comprising:
    one or more hydrocarbon-ingesting microbe strains; and
    a biocatalyst comprising a nonionic surfactant, a chlorine-absorbing salt, one or more nutrients for said microbe strains, and water.

2. The cleaner of claim 1 wherein:
    said nonionic surfactant is nonylphenol polyethylene glycol;
    said chlorine-absorbing salt is sodium thiosulfate; and
    said nutrients are urea and sodium hexamethaphosphate.

3. A method for treating soil which is contaminated with a hydrocarbon to a known depth, said method comprising the steps of:
    a. plowing the soil to the depth of said contamination;
    b. applying the cleaner of claim 1 to the soil; and
    c. applying sufficient water for 30-60 percent saturation of said soil.

4. A method for treating water which is contaminated with a hydrocarbon, said method comprising the steps of:
    a. mixing the microbial cleaner of claim 1 with said contaminated water; and
    b. adding water as necessary to ensure that said microbe strains remain wet.

5. A method for transforming a hydrocarbon into nontoxic substances, said method comprising:
    a. applying the microbial cleaner of claim 1 to the hydrocarbon; and
    b. if necessary, adding water to ensure that the microbial cleaner remains wet.

6. A method for cleaning a surface on which a liquid hydrocarbon has been spilled, said method comprising the steps of:
    a. containing said liquid hydrocarbon;
    b. mechanically removing a portion of said liquid hydrocarbon;
    c. if said surface is a solid surface, excepting soil, mixing the microbial cleaner of claim 1 with the liquid hydrocarbon, then rinsing the surface with water;
    d. if the surface is soil, mixing the microbial cleaner of claim 1 with the soil that has exposed to the liquid hydrocarbon and adding sufficient water to thoroughly moisten the mixture of liquid hydrocarbon-exposed soil and microbial cleaner; and
    e. if the surface is water, applying a sufficient amount of the microbial cleaner of claim 1 to cover the liquid hydrocarbon.

* * * * *